(No Model.)

H. K. JONES.
BARBED WIRE SHOE NAIL.

No. 313,078. Patented Mar. 3, 1885.

Attest:
Philip F. Larner
Howell Bartle

Inventor:
Horace K. Jones
By Wm C. Mma
Attorney.

UNITED STATES PATENT OFFICE.

HORACE K. JONES, OF HARTFORD, ASSIGNOR TO THE RUSSELL & ERWIN MANUFACTURING COMPANY, OF NEW BRITAIN, CONNECTICUT.

BARBED-WIRE SHOE-NAIL.

SPECIFICATION forming part of Letters Patent No. 313,078, dated March 3, 1885.

Application filed April 14, 1884. (No model.)

*To all whom it may concern:*

Be it known that I, HORACE K. JONES, of Hartford, in the county of Hartford and State of Connecticut, have invented certain new and useful Improvements in Round-Wire Barbed Nails; and I do hereby declare that the following specification, taken in connection with the drawings furnished and forming a part of the same, is a clear, true, and complete description of my invention.

The main novel or characteristic feature of a round-wire nail embodying my invention is a shank having throughout its length a continuous spiral barb as distinguished from prior wire nails of various kinds having shanks which are spirally barbed for only a portion of their length, and have the remainder thereof smooth or in the normal condition of the wire. As a result of this portion of my invention I not only obtain that greater holding capacity which is due to the extended barbed surface, but—what is of much greater consequence—I can manufacture such nails more economically than any prior spirally-barbed wire nail known to me, because the round wire from which my nails are made is first spirally barbed, and is then presented to an ordinary wire-nail machine, and, so far as my knowledge extends, I am the first to cut nails from spirally-barbed round wire.

The point or tip of my nail may be largely varied in form without departure from the main feature of my invention; but a nail having an angular-cut point and a shank spirally barbed throughout its length constitutes another feature of my invention.

Certain methods and tools for the economical manufacture of my novel nails have been devised by me, and they will be made the subject of separate applications for Letters Patent.

Figure 1:
Figure 2:
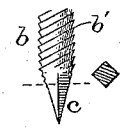
Figure 3:
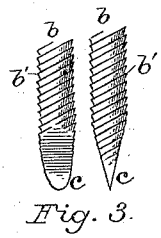
Figure 4:
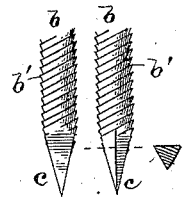

Referring to the drawings, Figure 1 represents in side view one of my nails in what I deem its best form. Fig. 2 is an enlarged view of the point or tip of the nail, Fig. 1. Figs. 3 and 4, in several enlarged views, illustrate two well-known forms of cut points which may be developed, if desired, on nails embodying the main feature of my invention.

The head $a$ may be flat, crowned, round, square, or otherwise shaped without departure from my invention. The shank $b$ is essentially spirally barbed, as at $b'$, throughout its length; but it is immaterial as to whether said barb is developed by the mere displacement of metal, as by means of rotating wheel-dies which revolve with a planetary movement around the wire, or by cutting operations, as by means of dies operating after the usual manner of screw-threading dies; but it is to be understood that the barb produced by spiraling is not to serve as the thread of a screw either for rotatively advancing or retiring the nail, as is possible with what are termed "drive-screws;" and although the holding capacity of the barbs should be necessarily varied according to the size of the wire from which the nails are to be cut in each case, said barb need seldom, if ever, be of such dimensions as would enable it to serve as a thread for advancing or even retiring the nail from its seat by mere rotation. It is also to be understood that in driving my nails there is no tendency to rotation, as is intended with the screw-threaded headless nail shown and described in the United States Patent to Godfrey, No. 86,832, July 9, 1869, it being obvious that such a tendency would lessen the holding capacity of the nail; and it is further to be understood that an ordinary screw-thread is not the equivalent of a spiral barb, it being obvious that the latter enables a nail to be driven without cutting the walls of its hole, and that it therefore effectually opposes withdrawal, while an ordinary screw-thread cuts its way on being driven, and therefore it offers comparatively little resistance in withdrawal.

The cut point $c$ preferred by me is the well-known four-sided angular point, as shown in Figs. 1 and 2, and an angular point is claimed by me in connection with a nail cut from spirally-barbed wire as a novel feature, because, as indicated in the drawings, the angles or corners of the point are also barbed for a considerable portion of their length, thus increasing the adhesive capacity of the nail when driven. This extension of the barbed surfaces upon the edges of the point is to some extent also available if the point be cut in wedge shape, as shown in Fig. 3, and also if the point be cut in a pyramidal or three-sided form, as indicated in Fig. 4; but it is to be understood that I do not broadly claim a nail having an angular point roughened at its corners or angles.

Having thus described my invention, I claim as new and desire to secure by Letters Patent—

1. A headed and pointed round cut nail composed of spirally-barbed wire, substantially as described.

2. A headed and pointed round-wire nail having a shank spirally barbed throughout its length, substantially as described.

3. A headed round-wire nail having a shank spirally barbed throughout its length, and an angular point, substantially as described.

HORACE K. JONES.

Witnesses:
HENRY E. RUSSELL, Jr.,
MARTIN S. WIARD.